June 1, 1954

J. A. PECK ET AL 2,679,756

VELOCITY RECORDER

Filed Nov. 16, 1951

2 Sheets-Sheet 1

Inventors
Joseph A. Peck
deceased
by Allen S. Peck
administrator
and Clifford T. Hultin
By Attorney June 1, 1954     J. A. PECK ET AL     2,679,756
VELOCITY RECORDER
Filed Nov. 16, 1951     2 Sheets-Sheet 2
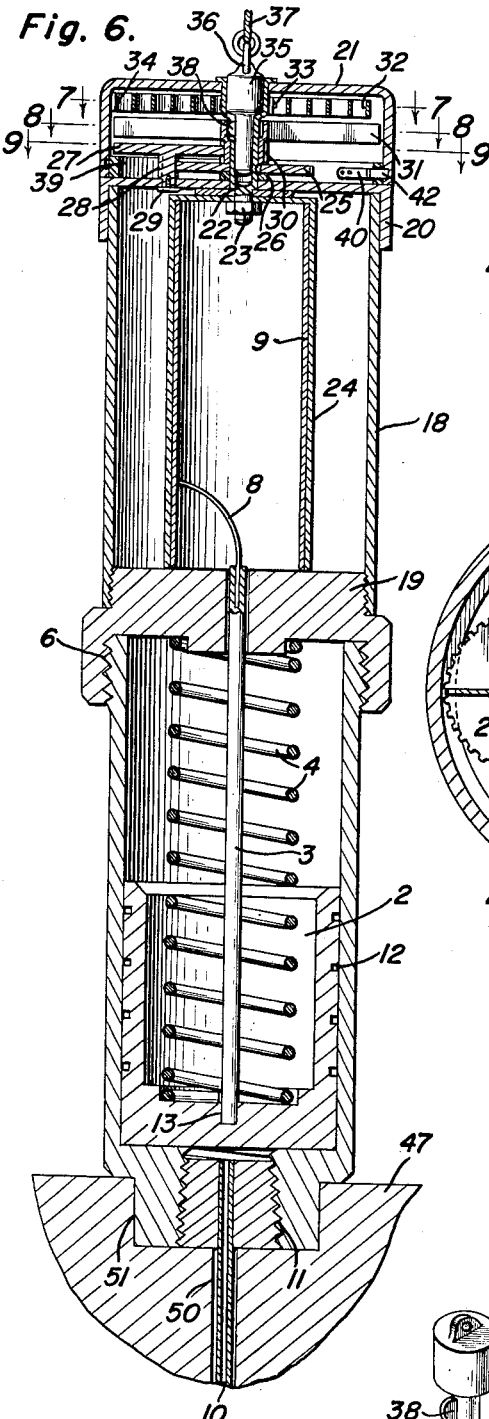
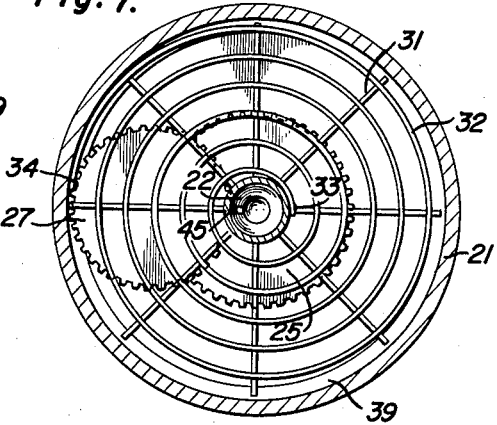
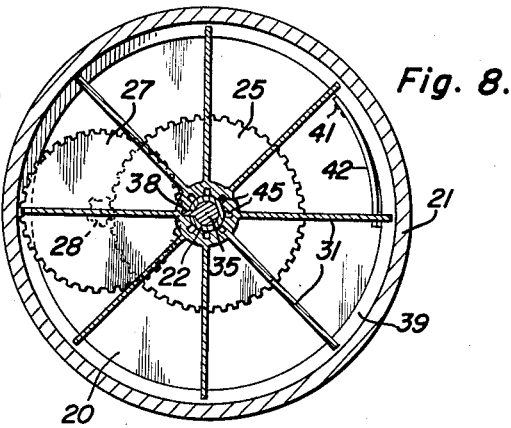
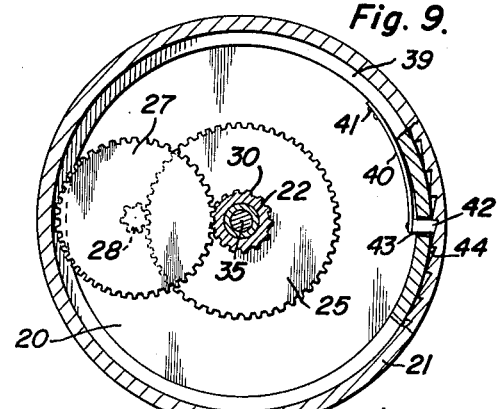
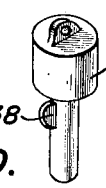
Fig. 10.
Inventors
Joseph A. Peck, deceased
by Allen S. Peck, administrator
and Clifford T. Hultin
By George Renehan
Attorney Patented June 1, 1954

2,679,756

UNITED STATES PATENT OFFICE 2,679,756

VELOCITY RECORDER

Joseph A. Peck, deceased, late of Worcester, Mass., by Allen S. Peck, executor, Worcester, Mass., and Clifford T. Hultin, Arlington, Va., assignors to the United States of America as represented by the Secretary of the Army Application November 16, 1951, Serial No. 256,692

4 Claims. (Cl. 73—182)

This invention relates to a velocity recorder for determining the velocity of bombs in flight. More particularly it relates to a mechanism that can be placed in a test bomb so that the maximum velocity of the bomb in flight can be recorded.

In designing bombs for satisfactory flight characteristics, it is not enough to rely on theoretical calculations only. After a bomb has been designed, it must be drop tested experimentally to simulate actual conditions as closely as possible. Moreover, it is necessary to preserve the data acquired in such tests in order that the data may be subsequently evaluated.

The present invention has for its purpose the determination of the velocity of fall of a test bomb. A further object is to make a permanent record of such data. More specifically, the object is to provide a mechanism which will register air pressure created by the falling bomb and to register this pressure on a paper record by means of a stylus.

Figure 1:
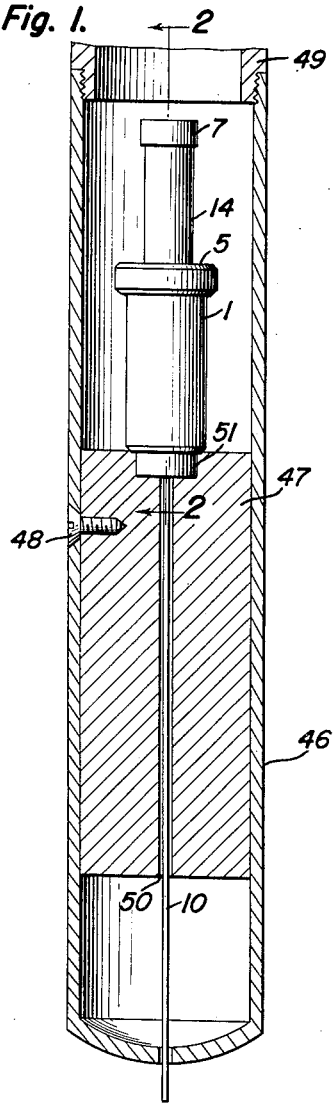
Figure 2:
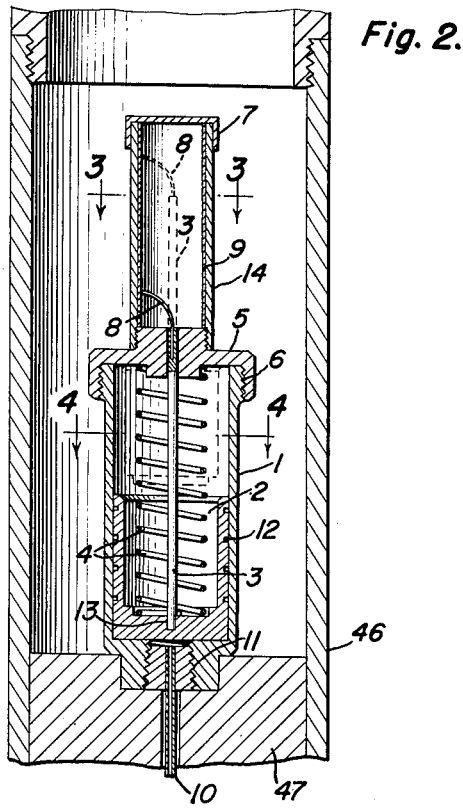
Figure 3:
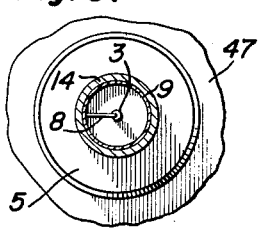
Figure 4:
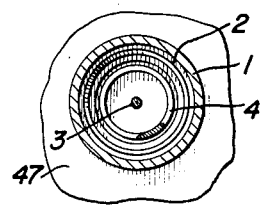
Figure 5:
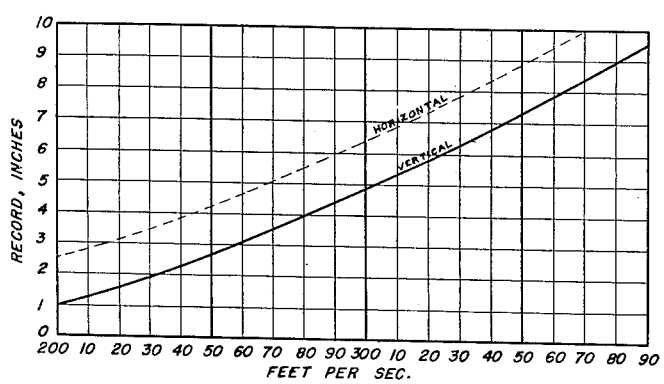

In the drawings, Fig. 1 shows a section of a bomb casing with the recorder in place. Fig. 2 is a sectional view of the recorder in the bomb casing. Fig. 3 is a transverse section at 3—3 on Fig. 2. Fig. 4 is a transverse section at 4—4 on Fig. 2. Fig. 5 shows a graph of the calibration of the instrument. Fig. 6 shows a modification of the instrument using a spring mechanism for rotating the cylinder holding the recording paper. Figs. 7, 8, and 9 are cross-sections of Fig. 6, at 7—7, 8—8 and 9—9, respectively.

Fig. 10 shows the key, the removal of which starts the timing mechanism of Fig. 6.

More specifically, 1 is the cylindrical body of the recorder; 2 is the piston moving in said cylinder; 3 is the piston-rod; 4 is the piston biasing spring; 5 is the cylinder cover; 6 are the threads between cylinder and cover; 7 is the cover on the record cylinder; 8 is the stylus engaging the record paper; 9 is the record paper; 10 is the impact air tube connecting with the cylinder below the piston; 11 is the screw connection between impact tube and cylinder; 12 are sealing grooves in the piston; 13 is the compression fit between piston and connecting rod; 14 is the recording cylinder; 18 is the enlarged cylinder supporting the timing mechanism of Fig. 6; 19 is the main cylinder cover; 20 is a tight fitting cylinder cover supporting the timing mechanism; 21 is the spring winding drum; 22 is the hollow central stud which rotates the recording drum; 23 is the nut fitted on the end of the hollow stud for holding the recording drum in place; 24 is the recording drum; 25 is a spur gear attached to the hollow stud; 26 is a spacing washer between spur gear 25 and cover 20; 27 is an additional spur gear which is journalled in cover 20; 28 is a small pinion in combination with spur gear 27; 29 is a capscrew holding the gear assembly 28—29 in place on cover 20; 30 is a pinion rotating on hollow stud 22; 31 is a multiple air vane attached to pinion 30; 32 is the flat coil spring for supplying the driving force to the mechanism; 33 is the rivet attachment of the coil spring to the hollow stud 22; 34 is the rivet attachment of the coil spring to the flange of the winding drum 21; 35 is the locking pin which fits into the hollow stud 22; 36 is a pull ring which fits through the ear of the locking pin 35; 37 is the pull string for the locking pin 35; 38 is the locking fin on locking pin 35; 39 is the guide flange for positioning the winding drum 21; 40 is the pawl spring for locking winding drum 21; 41 are rivets for attaching the pawl spring to the guide flange 39; 42 is the pawl head for engaging the ratchet teeth in the flange of winding drum 21; 43 is the opening in the guide flange 39 for admitting the pawl head 42; 44 are the ratchet teeth in the flange winding drum 21; 45 are slots in the pinion and vane 30 and 31 for admitting fin 38 of locking pin 35; 46 is the outer casing of the dummy bomb holding the recorder; 47 is the ballast weight within the dummy bomb casing; 48 is a flat head screw stud for holding the ballast weight in place; 49 is a portion of the bomb tail section; 50 is the opening in the ballast weight to permit tube 10 to pass through; 51 is the recess wherein the recording cylinder is held in a press fit.

The instrument shown in Figs. 1 and 2 is assembled by placing the combination piston and piston rod 2 and 3 in the cylinder 1. Biasing spring 4 is inserted and cover 5 is applied. Cylinder 14 which holds the recording paper is screwed on top of cover 5 and the waxed recording paper 9 is inserted beneath the stylus 8 and cover 7 is then applied. The impact air tube 10 is screwed in place and the instrument is fitted within the bomb casing 46.

In the casing shown, ballast weight 47 serves the dual purpose of supporting the instrument as well as giving the bomb the required weight to simulate the regular bomb. Section 49 supports the tail structure which is not shown.

Before the instrument can be used it must be calibrated. This is accomplished by passing a stream of air of known velocity over the instrument into impact tube 10. Calibration curves for such an instrument are shown in Fig. 5 where the abscissa represents velocity of the air in feet per second and the ordinate represents the compression of the spring in inches and therefore the corresponding movement of the stylus on the record paper. The solid line represents the calibration results with the instrument in a vertical position whereas the broken line represents the calibration results with the instrument in a horizontal position. The difference between the two substantially parallel lines is explained by the weight of the piston and moving parts which, in the vertical position, are added to the tension of the spring.

After having determined the calibration results of the instrument, it can be utilized for making a test drop. The instrument is arranged within the bomb casing in such a manner that the impact air tube projects into free air. A paper is fitted under the stylus in the recording cylinder and the bomb is dropped from a predetermined height. As the test bomb falls free the ram effect of the air impinges on the piston and pushes the same up against the compression of the spring. This results in a record being impressed on the paper by the stylus. In the instrument shown in Figs. 1 and 2, the record appears as a straight vertical line, the highest point of which can be read off on the calibration chart as feet per second. It represents the maximum velocity attained by the bomb and if the fall is sufficiently great, it represents the terminal velocity of the bomb.

Where it is desired to know not only the terminal velocity, but also the rate at which this velocity is attained, it can be accomplished by the modification shown in Fig. 6. In this modification, the record paper instead of being contained in the casing 14 is inserted in an inner cylinder 24. This inner cylinder is slowly rotated by means of a spring driven escapement mechanism which moves the recording paper transversely to the movement of the stylus.

In this structure there is shown an inner drum 24 which is fitted within the outer cylinder 18. This drum is attached to the hollow shaft 22 by means of nut 23. This shaft passes through and is journaled in cover 20. Spur gear 25 is fixed on this shaft whereas retarding fan 31 and its integral pinion gear 30 is rotatably mounted on this same shaft. Spur gear 27 and pinion 28 are integral and are rotatably mounted in the cover 20 by means of cap screw 29.

Spiral spring 32 is affixed to the hollow shaft at 33 and to the inside of the winding drum 21 at 34. This drum rotates on shaft 22 and also on a flange 39 which is attached to the cover 20. When drum 21 is turned by hand, it winds the spiral spring 32 which, in the process of unwinding, rotates shaft 22 and attached drum 24. To permit spring 32 to be wound and energy stored therein, a pawl 40 to 42 is attached to the cover flange 39 and engages drum 21 to prevent its unwinding. To prevent the spring from quickly unwinding through cylinder 24, the gear train 25, 27, 28 and 30 is interposed between shaft 22 and fan 31. Thus shaft 22 cannot be rotated by the spring 32 without actuating the gear train and fan 31 which accordingly slows down and times the motion of the cylinder 24. The degree to which this motion is slowed can be effected by adding one or more gears to the train or by increasing the fanblade surfaces.

Key 35 is shaped to fit the inside of the hollow shaft 22. The key is provided with a side fin 36 which passes thru a slot in the side of shaft 22 and also a slot 45 in the hub of fan 31. Accordingly, when said key is in place it locks the mechanism by preventing the retarding fan from turning with respect to shaft 22. When this key is withdrawn by means of the wire 37, the spring motor immediately begins functioning and drum 24 with its record paper is slowly rotated under stylus 8. In actual operation key 35 is fixed in place, a paper is placed in the recording cylinder, the spring is wound by turning drum 21 and the entire mechanism is placed in the bomb casing. Wire 37 is let out through a suitable opening in the tail of the bomb and attached to the plane. When the bomb is dropped, the wire withdraws the key 35 and the mechanism begins to function.

The angular velocity of the cylinder 15 may be any reasonable value but is preferably such that not more than one revolution of the cylinder occurs during the fall of the bomb. In this way the stylus will form a helical trace of one turn on the paper, which trace rises slowly and reaches a maximum at some part of the fall. If the fall is sufficiently great, this maximum will be reached before the bomb strikes and will represent the terminal velocity of the bomb. After such terminal velocity is reached, the stylus will trace a horizontal line on the paper. When the bomb strikes, the piston will fall and the stylus will trace a vertical line to the starting level. By means of such graphs, the velocity of the bomb at any time after its release can be readily determined. It is also possible to determine the time it takes for the bomb to reach terminal velocity as well as the total time of its fall. A record of this type may approach that shown in Fig. 5 where the abscissa would then represent time.

In the construction of a recorder according to Fig. 6, it is important that the piston and stylus be prevented from rotating with the movement of the record cylinder. This can readily be accomplished in any well known manner such as a grooved or non-circular piston rod that passes thru a corresponding shaped opening in cover 19. In any event, friction must be maintained at a low value. The timing mechanism 17 may be of the balance wheel escapement type or of the type disclosed which utilizes a rotating vane to reduce the speed of the rotating drum to the desired value. If the bomb is to rotate in its descent the spring mechanism must be so constructed that the rotation of the bomb does not affect the timing.

We claim:

1. Apparatus for determining velocity of a falling bomb which comprises a cylinder closed at one end by an apertured wall, a Pitot tube fitted to said apertured wall, said cylinder being closed at the other end by an apertured cover, a piston in said cylinder, a coil spring in said cylinder biasing said piston toward the apertured wall, a second rotatable cylinder aligned with said first cylinder and extending from said cover and having a recording paper on the inside wall thereof, a piston rod extending from said piston through the aperture in said cover and into said second cylinder, a stylus on said piston rod in said second cylinder biased toward the cylinder wall of said second cylinder, a supporting structure above said cylinder adapted to support said second rotating cylinder, a spring actuated mechanism mounted on said supporting structure for rotating said second cylinder at a predetermined angular velocity, means in said spring actuated mechanism to prevent operation thereof and releasable for starting at the moment a bomb containing the apparatus is dropped.

2. Apparatus according to claim 1 wherein said last named means comprises a removable locking key engaging two relatively movable elements in said mechanism and which is adapted to be pulled out of the mechanism.

3. Apparatus according to claim 2 wherein the spring actuated mechanism contains a rotating fan to serve as a delay mechanism.

4. Apparatus according to claim 3 wherein the locking key has a pull string attached whereby said locking key is withdrawn at the instant the bomb containing the apparatus is released.

References Cited in the file of this patent

UNITED STATES PATENTS

| Number | Name | Date |
|---|---|---|
| 1,280,354 | Zigler et al. | Oct. 1, 1918 |
| 2,265,098 | Bettis | Dec. 2, 1941 |

FOREIGN PATENTS

| Number | Country | Date |
|---|---|---|
| 124,783 | Great Britain | Apr. 10, 1919 |